United States Patent Office 3,647,802
Patented Mar. 7, 1972

3,647,802
2-AMINO-4-ARYL-3,4-DIHYDROQUINOLINES
Richard William James Carney, New Providence, N.J., assignor to Ciba Corporation, Summit, N.J.
No Drawing. Continuation-in-part of application Ser. No. 638,593, May 15, 1967, now Patent No. 3,538,101. This application Jan. 22, 1970, Ser. No. 5,106
Int. Cl. C07d 33/52
U.S. Cl. 260—288　　4 Claims

ABSTRACT OF THE DISCLOSURE

2 - amino - 4 - aryl - 3,4 - dihydroquinolines, e.g. those of the formula

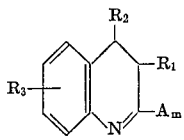

Am=an amino or hydrazino group
$R_1$=H, aliphatic, araliphatic or aromatic radical
$R_2$=aromatic radical
$R_3$=H, alkyl, alkoxy, alkylmercapto, halogeno, $CF_3$, $NO_2$ or amino acyl derivatives, quaternaries and salts thereof, exhibit anti-inflammatory effects.

CROSS-REFERENCES TO RELATED APPLICATIONS

This is a continuation-in-part of application Ser. No. 638,593, filed May 15, 1967, now U.S. Pat. No. 3,538,101.

SUMMARY OF THE INVENTION

The present invention concerns and has for its object the provision of new 2 - amino - 4 - aryl - 3,4 - dihydroquinolines, more particularly those of the Formula I

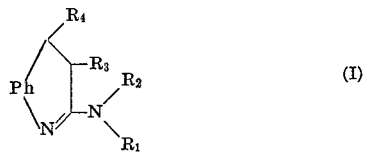

in which Ph is a 1,2-phenylene radical, $R_1$ is hydrogen, amino or an aliphatic hydrocarbon radical, $R_2$ is an aliphatic or araliphatic hydrocarbon radical, $R_3$ is hydrogen, an aliphatic, araliphatic or aromatic radical and $R_4$ is a carbocyclic or heterocyclic, mono- or bicyclic aromatic radical, of acyl derivatives, quaternaries and salts thereof, of corresponding pharmaceutical compositions, new starting materials and of methods for the preparation and application of these products. Said compositions are useful antiinflammatory agents, preferably for enteral, e.g. oral application, in the treatment of tissue inflammations, such as arthritic inflammations and similar conditions.

DESCRIPTION OF THE PREFERRED EMBODIMENTS

The 1,2-phenylene radical Ph is unsubstituted or substituted by one or more than one of the same or different substituents attached to any of the positions available for substitution. Such substituents are, for example, lower alkyl, such as methyl, ethyl, n- or i-propyl or -butyl, etherified hydroxy or mercapto, for example, lower alkoxy or alkylmercapto, such as methoxy, ethoxy, n- or i-propoxy or -butoxy, methyl- or ethylmercapto, esterified hydroxy, for example halogeno, such as fluoro, chloro or bromo, trifluoromethyl, nitro or amino, for example, di-lower alkylamino, such as dimethylamino or diethylamino. Preferred 1,2-phenylene radicals Ph are 1,2-phenylene, (lower alkyl)-1,2-phenylene, (lower alkoxy)-1,2-phenylene, (lower alkylmercapto)-1,2-phenylene, (halogeno) - 1,2 - phenylene, (trifluoromethyl)-1,2-phenylene, (nitro) - 1,2 - phenylene or (dilower alkylamino)-1,2-phenylene.

An aliphatic radical $R_1$, $R_2$ and/or $R_3$ represents especially lower alkyl, such as methyl, ethyl, n- or i-propyl, -butyl, -pentyl, -hexyl or -heptyl. $R_2$ may also stand for lower alkenyl, such as allyl or methallyl, cycloalkyl or cycloalkyl-lower alkyl having from 3 to 8, especially from 5 to 7, ring-carbon atoms, such as cyclopropyl, cyclopentyl, cyclohexyl, cycloheptyl or cyclooctyl, cyclopropylmethyl, cyclopentylmethyl, 2-cyclopentylethyl, cyclohexylmethyl, 1-cyclohexylethyl or cycloheptylmethyl. An araliphatic radical is preferably monocyclic carbocyclic aryl-lower alkyl, such as benzyl, 1- or 2- phenylethyl. These radicals are unsubstituted or contain additional substituents, especially in the aromatic portion those mentioned for Ph and in the aliphatic portion preferably hydroxy. They also may be interrupted by hetero atoms, preferably by one oxygen, sulfur and/or nitrogen atom. Such radicals are, for example, lower alkoxy-lower alkyl, such as methoxymethyl, ethoxymethyl, n-propoxymethyl, 1- or 2-methoxy-, ethoxy or i-propoxy-ethyl, 1-, 2- or 3-methoxy-, ethoxy- or n-propoxy-propyl or 4-tert. butoxybutyl, the corresponding lower alkylmercapto-lower alkyl or phenoxy-lower alkyl groups, mono- or di-lower alkylamino-lower alkyl, lower alkyleneimino-lower alkyl or aza-, oxa-, or thia-alkyleneimino-lower alkyl or N-(lower alkyl-, hydroxy-lower alkyl- or phenyl)-aza-alkyleneimino-lower alkyl groups with preferably 4 to 6 ring-carbon atoms and in which the hetero-atoms are separated from each other by at least 2 carbon atoms, such as 2-methylamino-, 2-dimethylamino- or 2-diethylaminoethyl, 3-dimethylamino- or 3-diethylamino-propyl, 2-pyrrolidino-ethyl, 3-piperidino-propyl, 2-piperazino-ethyl, 2 - (4 - methyl - piperazino) - ethyl, 3 - (4 - ethylpiperazino) - propyl, 2 - [4 - (2 - hydroxyethyl) - piperazino] - ethyl, 2 - (4 - phenyl - piperazino) - ethyl, 2-morpholino-ethyl or 3-thiamorpholino-propyl.

$R_1$ and $R_2$, when taken together, also represent lower alkylene, aralkylene, aza-, oxa- or thia-alkylene, N-(lower alkyl-, hydroxy-lower alkyl- or phenyl)-aza-alkylene, in which the hetero atoms are separated from each other by at least 2 carbon atoms, such as 1,2-ethylene, 1,4-butylene, 1,4- or 1,5-pentylene, 3-methyl- or phenyl-1,5-pentylene, 2,5- or 1,6-hexylene or 2,6-heptylene; 3-aza-1,5-pentylene, 3-[methyl-, ethyl-, (2-hydroxyethyl)- or phenyl] - 3 - aza - 1,5 - pentylene, 3-oxa- or thia-1,5-pentylene.

An aromatic radical, e.g. $R_3$ and/or $R_4$, particularly stands for mono- or bicyclic carbocyclic aryl, i.e., phenyl, 1- or 2-naphthyl, or monocyclic heterocyclic aryl, such as furyl, thienyl or pyridyl. Said aryl groups are unsubstituted or contain one or more than one of the same or different substituents attached to any position available for substitution, for example those mentioned for Ph. They primarily stand for phenyl, (lower alkyl)-phenyl, (lower alkoxy)-phenyl, (lower alkylmercapto)-phenyl, (halogeno) - phenyl, (trifluoromethyl) - phenyl, (nitro)-phenyl, (di-lower alkylamino)-phenyl, pyridyl, (lower alkyl)-pyridyl, furyl, (lower alkyl)-furyl, thienyl or (lower alkyl)-thienyl. A substituted amino group $R_1$ is preferably di-lower alkylamino.

The acyl derivatives of the invention are particularly those of carboxylic acids, preferably aliphatic, araliphatic or aromatic carboxylic acids, such as those mentioned below, especially of lower alkanoic acids, such as acetic, propionic, butyric or pivalic acid. The quaternaries of the invention are preferably the lower alkyl or aralkyl quaternaries.

The compounds of this invention exhibit valuable pharmacological properties. Apart from diuretic effects, they exhibit primarily antiinflammatory activity, as can be demonstrated in animal tests using, for example mammals, such as rats or dogs, as test objects. Such tests can be performed either according to Renzi et al., Tox. & Appl. Pharmacol. 1, 406 (1959) for diuresis or according to Winter et al., Proc. Soc. Exp. Biol. & Med. 111, 544 (1962) for antiinflammatory effects. The compounds of the invention can be applied enterally or parenterally, e.g. orally by stomach tube, advantageously in the form of aqueous solutions or suspensions (which may contain carboxymethylcellulose and polyethylene glycol as solubilizers), in the dosage range between about 1 and 75 mg./kg./day, preferably between about 5 and 50 mg./kg./day, advantageously between about 10 and 25 mg./kg./day. In view of the test results obtained, the compounds of the invention are valuable diuretics or antiphlogistics, advantageously in the treatment or management of arthritic or dematopathologic conditions. They are also useful intermediates in the preparation of other valuable products, particularly of pharmacologically active compounds. Thus the corresponding 2-amino-4-aryl-quinolines, disclosed in copending application Ser. No. 638,594, filed May 15, 1967 (now U.S. Pat. No. 3,542,785), are obtained from the compounds of this invention by dehydrogenation.

Particularly useful are compounds of the Formula I in which Ph stands for 1,2-phenylene, (lower alkyl)-1,2-phenylene, (lower alkoxy)-1,2-phenylene or (halogeno)-1,2-phenylene, $R_1$ for hydrogen or lower alkyl, $R_2$ for lower alkyl, lower alkenyl, cycloalkyl or cycloalkyl-alkyl with 3 to 6 ring- and 1 to 4 chain-carbon atoms, hydroxy-lower alkyl, mono- or di-lower alkylamino-lower alkyl, lower alkleneimino-lower alkyl, lower aza-, oxa- or thiaalkyleneimino-lower alkyl or $R_5$-lower alkyl, $R_1$ and $R_2$, when taken together, also stand for lower alkylene or lower aza-, oxa- or thiaalkylene or N-(lower alkyl or hydroxy-lower alkyl)-lower azaalkylene, wherein the heteroatoms are separated from each other by at least 2 carbon atoms, $R_3$ for hydrogen, lower alkyl or $R_6$ and each of $R_4$, $R_5$ and $R_6$ for phenyl, (lower alkyl)-phenyl, (lower alkoxy)-phenyl, (halogeno)-phenyl or pyridyl or therapeutically useful acid addition salts thereof.

Especially mentioned are the compounds of Formula II

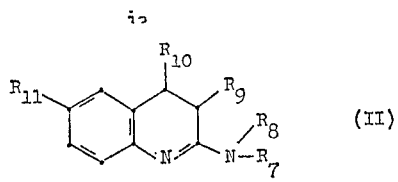

(II)

in which $R_7$ is hydrogen or methyl, $R_8$ is methyl, ethyl, n-propyl, i-butyl, allyl, cyclopropyl, cyclopropylmethyl, 2-hydroxyethyl, 2 - dimethylaminoethyl, 2 - diethylaminoethyl, benzyl, 4-fluorobenzyl or 2-pyridylmethyl or $R_7$ and $R_8$ together represent 1,4-butylene, 1,5-pentylene, 1,6-hexylene, 3 - methyl - 3 - aza - 1,5-pentylene or 3-oxa-1,5-pentylene, $R_9$ is hydrogen, methyl or phenyl, $R_{10}$ is phenyl or 4-methoxy-phenyl and $R_{11}$ is hydrogen or chloro, or therapeutically useful acid addition salts thereof which, when given orally to rats at doses between about 5 and 50 mg./kg./day, preferably between about 10 and 25 mg./kg./day, show outstanding antiinflammatory effects according to the granuloma pouch or carrageenin paw test or diuretc activity. The former effects are predominantly found in secondary amines, i.e. compounds of Formula II, in which $R_7$ is hydrogen, e.g. in the 2-isobutylamino - 4 - phenyl-6-chloro-3,4-dihydroquinoline, whereas diuretic activity is predominantly found in the corresponding tertiary amines, e.g. in the 2-dimethyl-amino - 3 - methyl - 4 - phenyl - 6 - chloro-3,4-dihydroquinoline.

The compounds of this invention are prepared according to known methods. For example, the process for their preparation consists in (a) reacting a 2-(hydroxy- or mercapto)-4-aryl-3,4-dihydroquinoline, more particularly such of the Formula III

(III)

in which X stands for oxygen or sulfur, or preferably a reactive ester or ether thereof, with ammonia or an amine, preferably that of the formula $R_1$—NH—$R_2$, or (b) reducing a 2-amino-4-aryl-quinoline, more particularly such of the Formula IV.

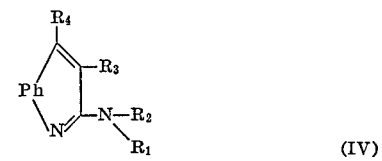

(IV)

or (c) condensing an N - (2 - aryl-hydroxymethyl-phenyl)-alkanoic or aralkanoic acid amidine, more particularly such of the Formula V

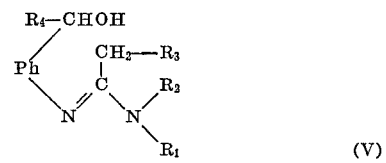

(V)

or preferably a reactive ester or ether thereof, or (d) condensing a β - (2 - amino - phenyl)-β-aryl-alkanoic or aralkanoic acid amide or nitrile, more particularly such of the Formula VI

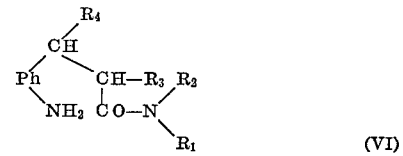

(VI)

and, if desired, converting any compound obtained into another disclosed compound.

A reactive ester, mentioned above, more particularly is such of a hydrohalic or sulfonic acid, such as of hydrochloric, hydrobromic, methane-, ethane-, benzene- or p-toluenesulfonic acid. A corresponding ether is preferably a lower alkyl or aralkyl ether. The reduction according to (b) is advantageously carried out with catalytically activated or nascent hydrogen, preferably hydrogen generated by the action of alkali metals or alkaline earth metals, e.g. sodium or calcium, or amalgams thereof, on alcohols, such as lower alkanols. In the condensation according to (c) and (d) any water, alcohol or mercaptan formed may either be distilled off azeotropically or absorbed by a condensing agent, such as a carbodiimide.

The compounds obtained according to said process may be converted into other disclosed compounds by methods in themselves known. Thus, for example, into the primary or secondary or tertiary amino nitrogen atom present, for example into compounds of Formula I, in which $R_1$ and/or $R_2$ stands for hydrogen, a substituent may be introduced, if necessary, after conversion of the compound obtained into a metal, e.g. alkali metal, derivative thereof. This can be done, for example, by reaction with a reactive ester of an approriate alcohol, for example, that of a hydrohalic, e.g. hydrochloric hydrobromic or hydriodic acid, or a sulfonic acid, such as a lower alkane or benzene sulfonic acid, e.g. those mentioned above, or an aryl diazonium salt, or by reductive alkylation, i.e. reaction with an appropriate oxo-compound and subsequent or simultaneous reduction, whereby higher substituted amines or hydrazines, or quaternaries are obtained. Analogously, primary or secondary amines may be acylated, for example with reactive functional derivatives of the corresponding acids, e.g. the halides or anhydrides thereof. In compounds, amino-substituted by radicals which can be eliminated, for example, amino-substituted by α-arylalkyl, e.g. benzyl, or acyl, e.g. acetyl or phthaloyl radicals, the said radicals can be split off in the usual manner by hydrogenolysis hydrolysis or hydrazinolysis.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents are especially used in the reaction with said reactive esters in order to eliminate the acid formed. They are basic agents, for example, alkali or alkaline earth metal carbonates or lower alkoxides, or more especially, organic bases such as pyridine or collidine, but particularly aliphatic tertiary amines, such as a tri-lower alkylamine, e.g. triethylamine.

The compounds of the invention are obtained in the free form or in the form of their salts, depending on the conditions under which the process is carried out. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric, hydrobromic, sulfuric, phosphoric, nitric or perchloric acid, aliphatic, alicyclic, araliphatic, aromatic or heterocyclic carboxylic or sulfonic acids, for example, formic, acetic, propionic, succinic, glycollic, lactic, malic, tartaric, citric, ascorbic, maleic, hydroxymaleic, pyroracemic, phenylacetic, benzoic, 4 - aminobenzoic, anthranilic, 4 - hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates.

The invention further includes any variant of the present process, in which an intermediate obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the reaction of the invention that lead to the formation of those compounds indicated above as being specially valuable.

The starting material used in the above process is partly described in the copending application mentioned in the beginning or can be prepared from the products described therein, mainly by reduction. Thus the starting material used in reaction (a) is prepared analogous to reaction (b) from the corresponding 2-hydroxy- or mercapto-4-aryl-quinolines, or the esters or ethers thereof, by partial reduction, for example with the use of catalytically activated hydrogen or alkali metal or alkaline earth metals and alcohols, or borohydrides, such as sodium borohydride. The starting material used in reaction (b) can be obtained analogous to reaction (a) from corresponding 2-hydroxy- or mercapto-4-aryl-quinolines or the esters or ethers thereof and ammonia or amines. The starting material used in reaction (c) can be obtained by reducing the corresponding ketones, for example, with the use of complex light metal hydrides, such as lithium aluminum hydride. Finally, the starting material used in reaction (d) can be prepared either by reduction of the corresponding β-(2-nitro-phenyl)-alkanoic or aralkanoic acid amides or nitriles or by amidation of the corresponding acids, advantageously their halides or esters. The starting material mentioned in reaction (a) is new and is considered to be included within the scope of the present invention. Preferably the compounds of Formula III, in which X stands for oxygen and the other symbols have the given meaning, also exhibits valuable pharmacological properties, more particularly diuretic and anti-inflammatory effects similar to those of the corresponding 2-amino compounds.

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts by weight. If not otherwise stated, the resulting 3,4-disubstituted compounds are mixtures of geometric isomers, which can be separated by fractional crystallization. Usually the trans-isomer is less soluble than the cis-isomer, both of which can be characterized according to their NMR-data.

EXAMPLE 1

To the stirred mixture of 3.9 g. 2-dimethylamino-4-phenyl-6-chloro-quinoline, 320 ml. ethanol and 50 ml. water, 250 g. 2% sodium amalgam are added portionwise during 1 hour and stirring in continued overnight. The supernatant solution is decanted off, the residue washed with ethanol, the organic solution filtered and evaporated.

The residue is recrystallized from hexane and isopropanol to yield the 2-dimethylamino-4-phenyl-6-chloro-3,4-dihydro-quinoline of the formula

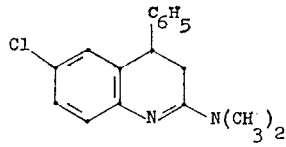

melting at 131–133°.

EXAMPLE 2

To the stirred mixture of 3.23 g. 2-dimethylamino-3-methyl-4-phenyl-6-chloro-quinoline, 260 ml. ethanol and 40 ml. water, 160 g. 2% sodium amalgam are added portionwise during one hour and the mixture is stirred overnight. Hereupon the supernatant solution is decanted off, the residue washed with ethanol, the combined solutions filtered, the filtrate evaporated in vacuo and the residue recrystallized from hexane to yield the 2-dimethylamino-3 - methyl - 4 - phenyl-6-chloro-3,4-dihydro-quinoline of the formula

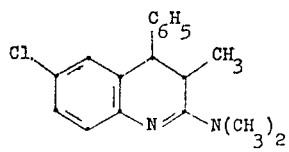

melting at 148–150°.

EXAMPLE 3

To the stirred mixture of 2.3 g. 2-cyclopropylmethylamino-4-phenyl-6-chloro-quinoline, 185 ml. ethanol and 29 ml. water, 115 g. 2% sodium amalgam are added during 1 hour and the mixture is stirred overnight. Hereupon the supernatant solution is decanted off, the residue washed with ethanol and the combined solutions evaporated in vacuo. The residue is taken up in water, the mixture extracted with diethyl ether, the extract dried, filtered and evaporated. The residue is recrystallized from ethanol to yield the 2-cyclopropylmethylamino-4-phenyl-6-chloro-3,4-dihydroquinoline of the formula

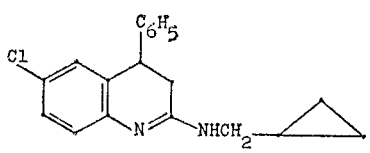

melting at 157–159°.

EXAMPLE 4

The mixture of 1.0 g. 2-chloro-3-phenyl-4-(4-methoxyphenyl)-3,4-dihydro-quinoline and 10 ml. dimethylamine is heated in a sealed tube for 6 hours to 150°. It is cooled, evaporated, the residue taken up in water and the mixture extracted with diethyl ether. The extract is dried, filtered, evaporated and the residue recrystallized from hexane to yield the 2-dimethylamino-3-phenyl - 4 - (4 - methoxyphenyl)-3,4-dihydro-quinoline of the formula

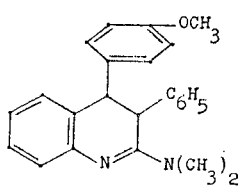

melting at 155–157°.

The starting material is prepared as follows:

To the stirred mixture of 14.0 g. 2-hydroxy-3-phenyl-4-(4-methoxy-phenyl)quinoline, 1040 ml. ethanol and 156 ml. water, 440 g. 2% sodium amalgam are added portionwise during 1 hour and stirring is continued overnight. The supernatant solution is decanted off, the residue washed with ethanol, the combined solutions evaporated in vacuo and the residue taken up in water. The mixture is extracted with chloroform, the extract dried, filtered, evaporated and the residue recrystallized from isopropanol to yield the 2-hydroxy-3-phenyl-4-(4-methoxy-phenyl)-3,4-dihydroquinoline melting at 210–213°.

The mixture of 3.0 g. thereof and 20 ml. phosphorus oxychloride is refluxed overnight. After cooling, it is poured onto ice water and extracted with diethyl ether. The extract is dried, filtered and evaporated and the residue recrystallized from ethanol to yield the 2-chloro-3-phenyl-4-(4-methoxy-phenyl)-3,4-dihydro-quinoline melting at 145–150°.

EXAMPLE 5

In the manner described in Examples 1–3 or 4, the following compounds of Formula II ($R_9$=H, $R_{10}$=$C_6H_5$, $R_{11}$=Cl) are prepared from equivalent amounts of the corresponding starting materials of Formula IV or III (X=O) respectively; the latter 2-hydroxy-compounds are converted into the 2-chloro-compounds as shown in Example 4:

| Final products | | Starting materials | |
|---|---|---|---|
| $R_7$ plus $R_8$ | M.P., degrees | III M.P., degrees | IV M.P., degrees |
| H plus n$C_3H_7$ | 123–124 | 260–262 | 110–112 |
| H plus $CH_2$—$CH(CH_3)_2$ | 151–152 | 260–262 | 136–138 |
| H plus cyclopropyl | 181–182 | 260–262 | 165–167 |
| $CH_3$ plus benzyl | 130–133 | 260–262 | 120–122 |
| H plus $C_2H_4$—$N(CH_3)_2$ | 108–110 | 260–262 | 118–120 |
| H plus $C_2H_4$—$N(C_2H_5)_2$ | 69–71 | 260–262 | 96–98 |
| 1,5-pentylene | 90–92 | 260–262 | 128–130 |
| 1,6-hexylene | 74–76 | 260–262 | 129–131 |
| 3-oxa-1,5-pentylene | 98–101 | 260–262 | 120–122 |

EXAMPLE 6

Preparation of 1000 tablets each containing 50 mg. of the active ingredient:

Formula: G.
2-dimethylamino-4-phenyl-6-chloro-3,4 - dihydro-quinoline _____ 50.0
Colloidal silica _____ 2.5
Corn starch _____ 7.5
Magnesium stearate _____ 1.0
Lactose _____ 89.0
Ethanol (anhydrous), q.s.
Purified water, q.s.

Procedure

The lactose and the drug substance are passed through a comminuting machine using a screen with 1.2 mm. openings. The stearate, starch and silica, previously mixed with a small portion of the lactose, are added to the sieved powders, which are mixed at low speed for 30 minutes. They are then granulated with ethanol-water (1:1) until suitable granules are formed. The granulate is passed through a comminuting machine (knives forward) using a screen with 4.0 mm. openings. The granulate is dried at 49° to a moisture content below 2%, again passed through a comminuting machine (knives forward) using a screen with 1.4 mm. openings and compressed into 150 mg. tablets using standard concave punches with 7.1 mm. diameter.

In the analogous manner tablets are prepared, each containing 50 mg. of the 2-cyclopropylamino- or 2-piperidino-6-chloro-4-phenyl-3,4-dihydro-quinolines.

EXAMPLE 7

Preparation of 10,000 tablets each containing 50 mg. of the active ingredient:

| Formula: | G. |
|---|---|
| 2-isobutylamino-4-phenyl-6-chloro-3,4-dihydro-quinoline | 500.0 |
| Lactose | 1,706.0 |
| Corn starch | 90.0 |
| Polyethylene glycol 6,000 | 90.0 |
| Talcum powder | 90.0 |
| Magnesium stearate | 24.0 |
| Purified water, q.s. | |

Procedure

All the powders are passed through a screen with an opening of 0.6 mm. Then the drug substance, lactose, talcum, magnesium stearate and half of the starch are mixed in a suitable mixer. The other half of the starch is suspended in 50 ml. water and the suspension added to the boiling solution of the polyethylene glycol in 50 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 8

To the stirred solution of 4.1 g. 2-dimethylamino-3,4-diphenyl-6-chloroquinoline in 320 ml. ethanol and 60 ml. water, 205 g. 2% sodium amalgam are added portionwise during ½ hour and stirring is continued overnight at room temperature. The supernatant suspension is decanted off, filtered and the residue recrystallized from ethanol, to yield the white trans-2-dimethylamino-3,4-diphenyl-6-chloro-3,4-dihydroquinoline of the formula

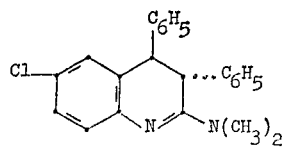

melting at 214.5–216°.

The first filtrate and second mother liquor are combined, evaporated in vacuo and the residue recrystallized from ethanol, to yield the yellow cis-2-dimethylamino-3,4-diphenyl-6-chloro-3,4-dihydroquinoline of the formula

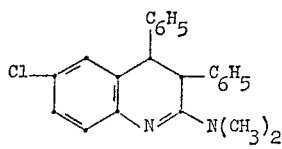

melting at 175–177°.

The starting material can be prepared as follows: To the stirred mixture of 50 g. 2-amino-5-chloro-benzophenone, 300 ml. benzene, 0.1 g. sodium acetate and 22 g. triethylamine, the solution of 88 g. phenylacetyl chloride in 50 ml. benzene is added dropwise. Hereupon the mixture is refluxed for 2½ hours and allowed to stand overnight at room temperature. 100 ml. water are added dropwise while stirring, and the mixture again kept overnight. The organic layer is separated and evaporated in vacuo. To the residue the solution of 34 g. sodium hydroxide in 50 ml. water and 500 ml. ethanol is added and the mixture refluxed for 1 hour. It is evaporated, the residue washed with water and triturated with 700 ml. hot 20% aqueous sodium hydroxide and then with 500 ml. 6 N hydrochloric acid. The solid is filtered off, washed with water, dissolved in chloroform, the solution treated with charcoal, filtered and evaporated. The residue is recrystallized from methanol, to yield the 2-hydroxy-3,4-diphenyl-6-chloroquinoline melting at 302–305°.

The mixture of 14 g. thereof and 100 ml. phosphorus oxychloride is refluxed for 2 hours. After cooling, it is added dropwise to an excess of ice water while stirring. The mixture is extracted with chloroform, the extract dried, filtered and evaporated. The residue is recrystallized from benzene-hexane, to yield the 2,6-dichloro-3,4-diphenyl-quinoline melting at 176–177°.

The mixture of 1.5 g. thereof and 7.5 ml. dimethylamine is heated in a sealed tube to 150° for 6 hours. It is then evaporated, the residue taken up in water, the mixture extracted with chloroform, the extract dried, filtered and evaporated in vacuo. The residue is recrystallized from hexane-benzene, to yield the 2-dimethylamino-3,4-diphenyl-6-chloroquinoline.

EXAMPLE 9

According to the methods described in the previous examples, advantageously according to Examples 1–3 and 8, the following compounds of Formula II are prepared from equivalent amounts of the corresponding starting materials: $R_{10}$=phenyl, $R_{11}$=chloro.

| $R_7$ plus $R_8$ | $R_9$ | M.P. |
|---|---|---|
| H plus $C_2H_4$—OH | H | 164–166°. |
| $CH_3$ plus $C_2H_4$—OH | H | 113.5–115.5°. |
| $CH_3$ plus $CH_2$—CH=$CH_2$ | H | 173–176° (2HCl). |
| H plus $CH_2$—$CH_2$—$CH_3$ | $CH_3$ | 166–168°. |
| H plus $CH_2$—CH($CH_3$)$_2$ | $CH_3$ | 158–160°. |
| H plus cyclopropyl | $CH_3$ | 154–156°. |
| H plus $C_2H_4$—N($C_2H_5$)$_2$ | $CH_3$ | [1] 198–204°/0.2 mm. |
| H plus 4-fluorobenzyl | H | 78–82°. |
| H plus 4-fluorophenyl | H | 176–179°. |
| H plus $CH_2$-2-pyridyl | H | 125–127°. |
| H plus $CH_2$—CH($CH_3$)$_2$ | $C_6H_5$ | 134–137° trans. |
| H plus $CH_2$—CH($CH_3$)$_2$ | $C_6H_5$ | 142–145° cis. |
| H plus cyclopropyl | $C_6H_5$ | 119–122° trans. |
| Do | $C_6H_5$ | 155–157° cis. |
| H plus $C_2H_4$—N($CH_3$)$_2$ | $C_6H_5$ | 99–100°. |
| H plus $C_2H_4$—N($C_2H_5$)$_2$ | $C_6H_5$ | 119–121° trans. |
| 1,5-pentylene | $C_6H_5$ | 222–225° trans. |
| Do | $C_6H_5$ | 152–155° cis. |
| 1,6-hexylene | $CH_3$ | 122–124°. |
| ($C_2H_4$)$_2$N—$CH_3$ | $CH_3$ | 165–168°. |
| ($C_2H_4$)$_2$N—$CH_3$ | H | 107–110°. |

[1] Boiling point.

The above dihiydrochloride is prepared by acidifying a concentrated ethanolic solution of the base with ethanolic hydrogen chloride.

I claim:

1. 2-amino-4-aryl-3,4-dihydro-quinolines of the formula

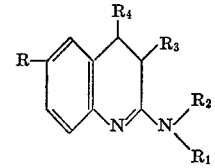

in which R is hydrogen or chloro, $R_1$ is hydrogen or lower alkyl, $R_2$ is lower alkyl, lower alkenyl, cyclo propyl, cyclo propylmethyl, hydroxy-lower akyl, mono- or di-lower alkylamino-lower alkyl, benzyl or 4-fluorobenzyl, or $R_1$ and $R_2$, when taken together, are alkylene with 4 to 6 carbon atoms, 3-(aza- or oxa)-1,5-pentylene or N-(lower alkyl)-3-aza-1,5-pentylene, wherein the heteroatoms are separated from each other by at least 2 carbon atoms, $R_3$ is hydrogen, lower alkyl or phenyl, wherein "lower" defines such radicals with up to 4 carbon atoms and is phenyl, or 4-methoxy phenyl, or a therapeutically useful acid addition salt thereof.

2. A compound as claimed in claim 1 and having the formula

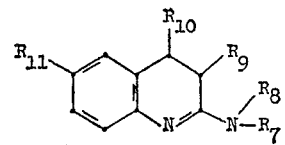

in which $R_7$ is hydrogen or methyl, $R_8$ is methyl, ethyl, n-propyl, i-butyl, allyl, cyclopropyl, cyclopropylmethyl, 2-hydroxyethyl, 2-dimethylaminoethyl, 2-diethylaminoethyl, benzyl, or 4-fluorobenzyl, or $R_7$ and $R_8$ together are 1,4-butylene, 1,5-pentylene, 1,6-hexylene, 3-methyl-3-aza-1,5-pentylene or 3-oxa-1,5-pentylene, $R_9$ is hydrogen, methyl or phenyl, $R_{10}$ is phenyl or 4-methoxyphenyl and $R_{11}$ is hydrogen or chloro, or a therapeutically useful acid addition salt thereof.

3. A compound as claimed in claim 1 and being the 2 - dimethylamino - 4 - phenyl-6-chloro-3,4-dihydroquinoline, or a therapeutically useful acid addition salt thereof.

4. A compound as claimed in claim 1 and being the 2 - isobutylamino-4-phenyl-6-chloro-3,4-dihydroquinoline, or a therapeutically useful acid addition salt thereof.

References Cited

UNITED STATES PATENTS

| 3,493,570 | 2/1970 | Plostnieks | 260—288 X |
| 3,272,824 | 9/1966 | Ebetino | 260—288 |
| 3,542,785 | 11/1970 | Carney | 260—289 |
| 3,576,801 | 4/1971 | Stauffer | 260—268 BQ |

FOREIGN PATENTS

| 122,751 | 7/1952 | U.S.S.R. | 260—288 |

DONALD G. DAUS, Primary Examiner

U.S. Cl. X.R.

260—268 BQ

PO-1050
(5/69)

UNITED STATES PATENT OFFICE
CERTIFICATE OF CORRECTION

Patent No. 3,647,802      Dated March 7, 1972

Inventor(s) RICHARD WILLIAM JAMES CARNEY

It is certified that error appears in the above-identified patent and that said Letters Patent are hereby corrected as shown below:

Column 1, line 4, assignors should read -- CIBA-GEIGY Corporation;

Column 10, line 65, after "and" insert -- $R_4$ --.

Signed and sealed this 10th day of September 1974.

(SEAL)
Attest:

McCOY M. GIBSON, JR.
Attesting Officer

C. MARSHALL DANN
Commissioner of Patents df